United States Patent

[11] 3,613,822

| [72] | Inventors | Harry A. Mackie<br>Raleigh, N.C.;<br>Howard R. Ross, Grosse Pointe Woods, Mich. |
|---|---|---|
| [21] | Appl. No. | 852,286 |
| [22] | Filed | Aug. 22, 1969 |
| [45] | Patented | Oct. 19, 1971 |
| [73] | Assignee | Transportation Technology, Inc.<br>Madison Heights, Mich. |

[54] COMBINED PLENUM CHAMBER AND JET CURTAIN AIR CUSHION DEVICE
12 Claims, 3 Drawing Figs.

[52] U.S. Cl. ..................................... 180/128, 180/124
[51] Int. Cl. ..................................... B60v 1/02, B60v 1/16
[50] Field of Search ............................... 180/128, 124, 118, 129

[56] References Cited
UNITED STATES PATENTS

| 3,101,125 | 8/1963 | De Ridder | 180/129 |
|---|---|---|---|
| 3,170,529 | 2/1965 | Kelley et al. | 180/129 X |
| 3,232,366 | 2/1966 | Cockerell | 180/124 |
| 3,291,239 | 12/1966 | Eggington et al. | 180/128 |
| 3,318,406 | 5/1967 | Scheel | 180/118 |
| 3,363,717 | 1/1968 | Hunt | 180/128 |
| 3,424,266 | 1/1969 | Cockerell | 180/118 |
| 3,478,836 | 11/1969 | Eckered et al. | 180/128 |

*Primary Examiner*—A. Harry Levy
*Attorney*—Barnard, McGlynn & Reising

ABSTRACT: An air cushion device including a rigid base with means in the form of a flexible diaphragm defining a plenum chamber beneath the base for confining a first cushion of air to support the device above a surface at heights within a first range when relatively low-pressure, superatmospheric air is supplied to the plenum chamber; and nozzle means for providing a jet curtain of high-pressure air operable to confine a second cushion of air to support the device above the surface at heights within a second range greater than the first range of heights when relatively high-pressure air is supplied to the nozzles.

PATENTED OCT 19 1971 3,613,822
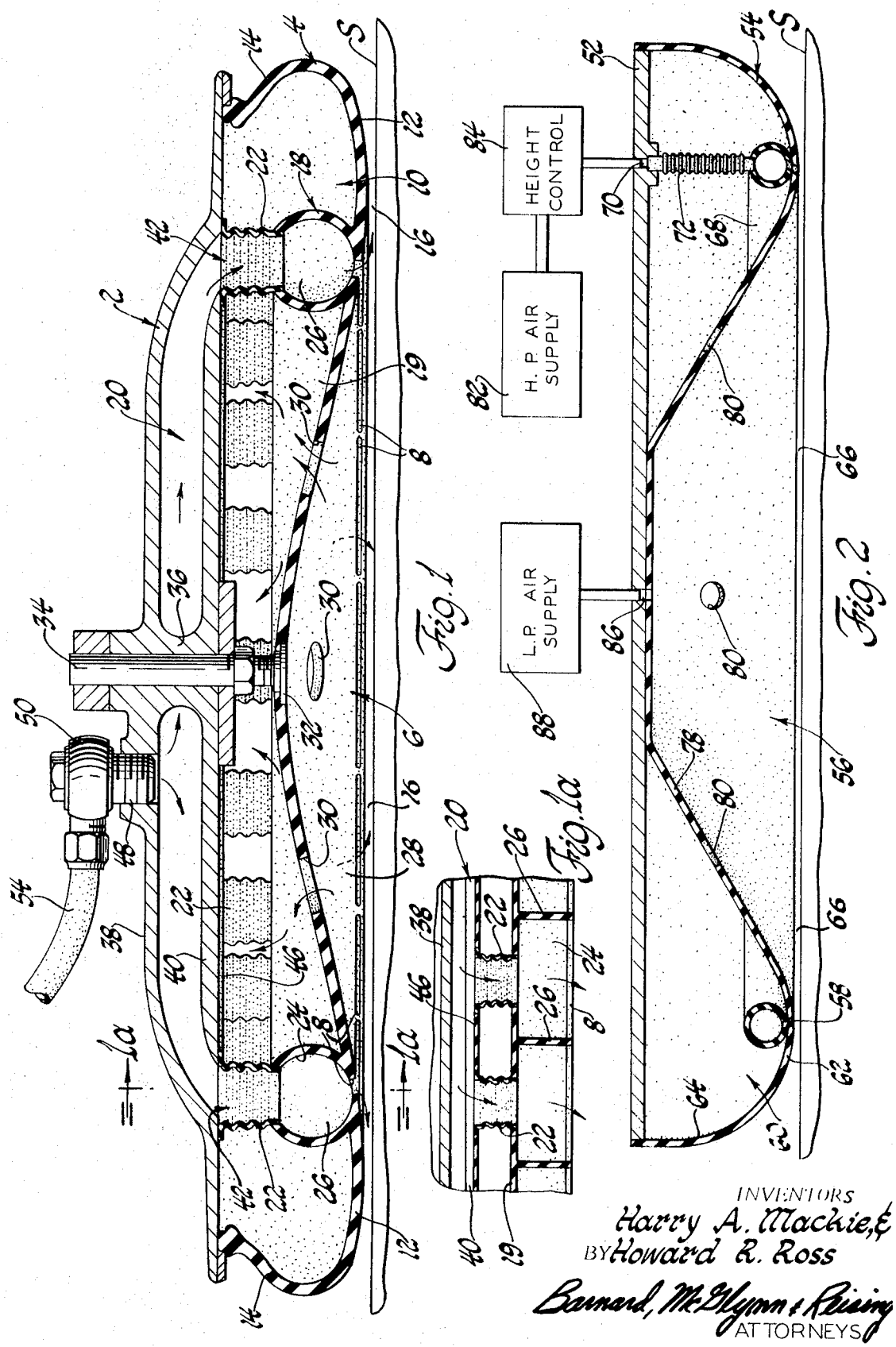
INVENTORS
Harry A. Mackie, &
BY Howard R. Ross
Barnard, McGlynn & Reising
ATTORNEYS

COMBINED PLENUM CHAMBER AND JET CURTAIN AIR CUSHION DEVICE

This invention relates generally to air cushion devices and is particularly concerned with an air cushion device capable of operating at different heights for low and high speed operation.

In the development of ground effect devices, or air cushion devices, several approaches have been taken for providing a cushion of air operable to support a platform above the surface in a substantially friction-free manner. Air cushion devices developed thus far include the type wherein a curtain or peripheral jet of air at high pressure confines a cushion of air beneath the device for supporting the device above the surface. Another type of air cushion device that has been developed includes a plenum chamber defined beneath a base or platform which confines a cushion of air when relatively low-pressure, superatmospheric air is supplied to the plenum chamber. As the pressure is increased within the plenum chamber, the differential pressure between the plenum chamber and the surrounding atmosphere causes the device to be lifted above the surface and permits air to escape from the plenum chamber through the gap or slot defined between the periphery of the plenum chamber and the surface over which the device is supported. One type of air cushion device that has been developed includes a substantially rigid base member beneath which is mounted a flexible diaphragm. When the diaphragm is inflated, it defines a plenum chamber beneath the base having a compliant wall. The diaphragm defines an inflatable chamber with the rigid base which communicates through openings in the diaphragm with the plenum chamber, and as a result, the portion of the diaphragm defining the periphery of the plenum chamber is held close to the surface over which it operates by the effect of the static pressure within the inflatable chamber defined by the diaphragm. The diaphragm, therefore, tends to adjust to surface contour and provides a constant thickness leakage slot between the periphery of the plenum chamber and the surface over which the base is supported.

The diaphragm-type air cushion device is attractive for ground transportation because it can operate with exceptionally low air flow. On smooth surfaces, this type of air cushion device has operated satisfactorily with pumping powers low enough to make such devices competitive with or even superior to wheeled systems in terms of rolling resistance versus pumping power. At low speeds, the diaphragm-type air cushion device has many advantages over the peripheral jet type of air cushion device. Because of low air flow, noise is minimal and the diaphragm-type air cushion device creates virtually no disturbance of the environment. However, this type of air cushion device operates above the surface at heights ranging approximately between 0.001 inches and 0.005 inches, and it is accordingly limited to low-to-moderate speeds over smooth or especially prepared surfaces. On the other hand, the peripheral jet curtain type of air cushion device is capable of operating at greater heights above the surface depending on the amount of air flow supplied to the jet nozzles. Consequently, the peripheral air curtain type of air cushion device is capable of operating at high speeds and is also capable of accommodating greater surface irregularities.

Thus, one type of air cushion device discussed above has the advantage of a low noise level and minimal disturbance of the environment but is limited in its ability to accommodate surface irregularities and thus is limited to the amount of horizontal speed or velocity, while the second type is capable of operating at greater heights above the surface and is thus capable of accommodating greater irregularities permitting it to travel at greater horizontal speeds but at the same time, has a higher noise level and creates a greater disturbance of the surroundings due to the high-pressure curtain of air.

It is, therefore, an object of this invention to combine in a single air cushion device the advantages of the plenum chamber type of operation and the jet curtain type of operation.

A further object is to provide an air cushion device which is capable of operating within a range of heights on the order of 0.001 inches to 0.005 inches at low-to-moderate speeds, and which is capable of operating at heights on the order of 0.25 inches to 0.75 inches at high speeds.

Another object lies in the provision of an air cushion device including a base with means defining a plenum chamber beneath the base for confining a first cushion of air to support the device above a surface at heights within a first range when relatively low-pressure, superatmospheric air is supplied to the plenum chamber, and including nozzle means for providing a jet curtain of high-pressure air for confining a second cushion of air to support the device above a surface at heights within a second range greater than the first range when relatively high-pressure air is supplied to the nozzle means.

Still another object is to provide an air cushion device having a rigid base with a flexible diaphragm attached thereto for defining a plenum chamber beneath the base having a compliant peripheral edge so that when relatively low-pressure, superatmospheric air is supplied to the diaphragm, the diaphragm will inflate and define a compliant plenum chamber, and further including nozzle means for selectively providing a jet curtain of air for confining a cushion of air beneath the base to support the base at a greater range of heights than is possible by the diaphragm plenum chamber.

The foregoing, and other objects, are achieved by the provision of an air cushion device including a base with means defining a plenum chamber beneath the base for confining a first cushion of air to support the device above a surface at heights within a first range when relatively low-pressure, superatmospheric air is supplied to the plenum chamber. The device further includes a nozzle means for selectively providing a curtain of high-pressure air to confine a second cushion of air for supporting the device above a surface at heights within a second range greater than the first range when relatively high-pressure air is supplied to the nozzle means. The means defining the plenum chamber includes a flexible diaphragm which also cooperates with the base to define an inflatable chamber. The plenum chamber thus has a compliant wall, the periphery of which is held close to the surface over which it is operating by the effect of static pressure within the inflatable chamber.

In one embodiment of the invention, a series of elongated slots are formed in the diaphragm which communicate with an endless duct connected with a source of compressed air. The slots define nozzles through which the compressed air is directed into the plenum chamber when the pressure is relatively low, but which provides a jet curtain to increase the height of operation when high-pressure air is supplied to the nozzles. The base is formed with an annular chamber connected with the compressed air source and a plurality of flexible conduits connects the annular chamber with the endless manifold member or duct. Thus, for both types of operation, the air flow is through the elongated slots and the type of operation depends upon the air pressure supplied to the nozzles.

In another embodiment of the invention, a separate relatively low-pressure air supply is connected with the plenum chamber through the central portion of the base while the jet nozzles are separately connected with a high-pressure air supply having a height controlling valve or similar device for selectively increasing or decreasing the rate of flow through the jets to vary the height of operation.

Other objects, advantages and features of the invention will become apparent from the following description taken in connection with the accompanying drawings in which:

FIG. 1 is a sectional view of an air cushion device embodying one form of the invention;

FIG. 1a is a detailed view taken on lines 1a—1a of FIG. 1; and,

FIG. 2 is a sectional view of an air cushion device embodying a second form of the invention.

FIG. 1 discloses an air cushion device comprising a base designated generally by reference numeral 2 with means in the form of a flexible diaphragm 4 secured to base 2 for defining a plenum chamber 6 beneath the base operable to confine a first cushion of air to support the device above a surface at heights within a first range when relatively low-pressure, superatmospheric air is supplied to plenum chamber 6; and nozzle means 8 for providing a curtain of high-pressure air for confining a second cushion of air to support the device above a surface at heights within a second range greater than the first range when relatively high-pressure air is supplied to the nozzle means 8. Diaphragm 4 cooperates with the base to define an inflatable chamber 10 with the base.

The diaphragm 4 is extendable when the inflatable chamber 10 is pressurized to form an outwardly extending portion 12 defining the periphery of the plenum chamber 6 as well as a compliant wall of a leakage slot or gap 16 for the plenum chamber 6. The outwardly extending portion 12 of the diaphragm merges with an upwardly extending peripheral portion 14 which is secured to the base member 2. The nozzle openings 8 are located inwardly of the outwardly extending portion 12 of the diaphragm such that air flowing through the nozzle openings 8 may be at least partially directed inwardly toward the plenum chamber 6.

Located in the inflatable chamber 10 is a manifold member 18 for conducting flow of air to the nozzle openings 8 formed in the diaphragm. The manifold member 18 is in the form of an endless duct 19 which communicates through flexible conduits 22 with an annular inlet chamber 20 formed in the base 2 and which is connected with a source of compressed air. In FIG. 1, the nozzle openings 8 are in the form of elongated slots formed in the diaphragm and communicating with the duct 19 which is integrally formed with the diaphragm. The duct 19 is made up of a series of cylindrical segments 24 separated by end wall members 26, and each of the slots 8 extend substantially the length of its associated cylindrical segment 24 (FIG. 1a).

Diaphragm 4 includes a concave central portion 28 anchored at its center relative to the base and defining the plenum chamber 6. Openings 30 are provided in the central portion 28 for providing communication between plenum chamber 6 and the inflatable chamber 10.

The central portion 28 of the diaphragm is anchored at its center to the head 32 of an anchor bolt 34 mounted in the axial opening of a center post 36 of the base member. The center post 36 separates the upper and lower walls 38 and 40, respectively, of the chamber 20. Walls 38 and 40 are separated to define an annular inlet opening or slot 42 which communicates with the interior of each of the flexible conduits 22. In the illustrated embodiment, and as shown in FIG. 1a, a portion 46 of flexible material closes the slot 42 between adjacent pairs of conduits 22. Compressed air is supplied to chamber 20 through a fitting 48 from a conduit 54 connected with fitting 48 by a swivel connector 50. Conduit 54 may be connected with a source of compressed air.

In the embodiment of FIG. 1, air is conducted from conduit 54 through chamber 20 into the distribution duct 19 and is discharged through the nozzle slots 8. For low-speed operation, relatively low-pressure, superatmospheric air is discharged through slots 8 into the plenum chamber 6, the air flowing through the openings 30 into the inflatable chamber 10 and between the flexible conduits 22 to inflate the diaphragm to the configuration shown in FIG. 1. A cushion of air is confined by the plenum chamber 6 having a greater pressure than the ambient air which causes the device to be lifted from the surface permitting air to escape through the leakage slot 16. The pressure in the inflatable chamber 10 tends to hold the outwardly extending portion 12 of the diaphragm close to the surface. The thickness of the leakage slot 16 is in the order of 0.001 to 0.005 inches at the relatively low airflow through the nozzle slots 8. The slots 8 are located inwardly of the outer periphery of the plenum chamber so as to have substantially uninterrupted communication with the plenum chamber for low airflow.

For operation at high speeds, the flow of air through conduit 54 is increased so that a peripheral jet curtain is discharged from the nozzle slots 8 which is operable to confine a cushion of air in the space bounded by the jet curtain and the central portion of the diaphragm which has the effect of increasing the thickness of slot 16 to a range of heights within approximately 0.25 to 0.75 inches. Thus, at relatively low airflows, diaphragm 4 defines a plenum chamber 6 which confines a cushion of air beneath base 2 having a pressure greater than the ambient pressure thereby lifting the device above the surface S. Air from the plenum chamber escapes through slot 16, and the height of slot 16 is maintained so long as air is supplied to the plenum chamber at a rate equal to the rate of discharge of air through the peripheral slot 16. In this mode of operation, the thickness of slot 16, or the height of the device above surface S, is in a range of from approximately 0.001 inches to 0.005 inches. By increasing the airflow, a peripheral jet curtain emits from nozzles 8, and a cushion of air is developed within the confines of the curtain of air directed downwardly from nozzles 8. In this mode of operation, diaphragm 4 no longer serves as the sole means for confining the supporting air cushion, and the thickness of slot 16, or the height of the device above surface S, is in a range of approximately 0.25 inches to 0.75 inches.

FIG. 2 illustrates an air cushion device having a base 52 with means in the form of a diaphragm 54 defining a plenum chamber 56 beneath the base 52 for confining a first cushion of air to support the device above the surface at heights within a first range when relatively low-pressure, superatmospheric air is supplied to plenum chamber 56; and nozzle means 58 for providing a jet curtain of high-pressure air for confining a second cushion of air to support the device above a surface at heights within a second range greater than the first range when relatively high-pressure air is supplied to the nozzle means 58. Diaphragm 54 defines an inflatable chamber 60 with the base and is extendable when the inflatable chamber is pressurized to form an outwardly extending portion 62 which defines the periphery of plenum chamber 56 as well as a compliant wall of a leakage slot 66 for the plenum chamber. The nozzles 58 are in the form of openings in the diaphragm which communicate with a manifold member 68 in the form of an endless duct located in the inflatable chamber 60 for conducting flow of air to the nozzles 58. An inlet 70 is defined in the base 52 for conducting compressed air to the duct 68 through a flexible conduit 72. Diaphragm 54 includes a central portion 78 extending inwardly from the outwardly extending portion 62 toward the base for defining the plenum chamber 56. Opening 80 in the central portion 78 provide communication between the plenum chamber 56 and the inflatable chamber 60.

The inlet 70 is connected with a high-pressure air supply indicated by reference numeral 82 through a height control valve or similar device indicated by reference numeral 84. A second inlet 86 is provided in the center portion of the base 52 which communicates directly with the plenum chamber 56 and which is connected with a supply of relatively low-pressure, superatmospheric air indicated by reference numeral 88.

For operation at low speeds, the low-pressure air supply is activated to supply air to the plenum chamber 56 through the inlet opening 86. The airflows into the plenum chamber 56 and through openings 80 into the inflatable chamber 60 to inflate the diaphragm and provide a first cushion of air for supporting the device above the surface S at heights within a first range of approximately 0.001 to 0.005 inches. That is, the thickness of the leakage slot 66 will be in the order of 0.001 to 0.005 inches for the low-speed operation. The static pressure within the inflatable chamber 60 will tend to hold the outwardly extending portion 62 of the diaphragm into close proximity with the surface S. As increased clearance is desired to permit operation over rough surfaces or at higher speeds, the high-pressure air supply is activated to introduce air to the nozzle 58 from the duct 68. The high-pressure air emanating from the nozzles 58 provides a peripheral curtain of high-pressure air to confine a second cushion of air operable to support the device above the surface at heights within a range of 0.25 to 0.75 inches depending upon the rate of flow through the high-pressure system. As the high-pressure airflow through nozzles 58 is increased, the low-pressure airflow through the inlet 86 may be reduced or shut off. As the clearance or thickness of the leakage slot 66 is increased, the operation of the device will approach the curtain jet in performance.

While specific examples of the invention have been illustrated and described in the foregoing specification and accompanying drawings, it should be understood that the invention is not limited to the exact construction shown but that various alterations in the construction and arrangement of parts is possible without departing from the scope and spirit of the invention.

The embodiments of the invention in which an exclusive property or privilege is claimed are defined as follows:

1. An air cushion device comprising: a base; a flexible diaphragm secured to said base and cooperating therewith to define an inflatable chamber beneath said base; said diaphragm being extendable when inflated to form an outwardly extending portion with a central portion extending inwardly therefrom toward said base; said central portion having a plurality of openings formed therein; a manifold member received in said chamber, said manifold member comprising a duct of flexible material; means defining an inlet in said base for compressed air; at least one flexible conduit connecting said duct with said inlet; and nozzle means formed in said duct and diaphragm for conducting air from said duct.

2. An air cushion device as claimed in claim 1, wherein said duct comprises a series of cylindrical segments separated by end wall members, and a separate flexible conduit connects each of said cylindrical segments with said inlet.

3. An air cushion device as claimed in claim 2 wherein said nozzle means includes a plurality of slots in said diaphragm each communicating with one of said segments and extending substantially the length thereof.

4. An air cushion device as claimed in claim 1 further including a second inlet in said base communicating with the central portion of said diaphragm.

5. An air cushion device as claimed in claim 4 including a high-pressure air supply connected with said first named inlet, and a low-pressure air supply connected with said second inlet.

6. An air cushion device comprising: a base; means defining a plenum chamber beneath the base for confining a first cushion of air to support the device above a surface at heights within a first range when relatively low-pressure, superatmospheric air is supplied to said plenum chamber; nozzle means for providing a curtain of high-pressure air for confining a second cushion of air to support the device above a surface at heights within a second range greater than said first range when relatively high-pressure air is supplied to said nozzle means; said means defining a plenum chamber including flexible diaphragm defining an inflatable chamber with said base; said diaphragm being extendable when said inflatable chamber is pressurized to form an outwardly extending portion defining the periphery of said plenum chamber as well as a compliant wall of a leakage slot for said plenum chamber; said nozzle means being located inwardly of the outwardly extending portion of said diaphragm; a manifold member located in said inflatable chamber for conducting flow of air to said nozzle means; said nozzle means including a plurality of openings in said diaphragm communicating with said manifold member; said manifold member comprising an endless duct located in said inflatable chamber; means defining at least one inlet in said base for compressed air; at least one flexible conduit connecting said duct with said inlet; each of said plurality of openings comprising an elongated slot in said diaphragm; said duct being integrally joined to said diaphragm and comprising a series of cylindrical segments separated by end wall members, each of said slots extending substantially the length of an associated cylindrical segment.

7. An air cushion device as claimed in claim 6 wherein said means defining an inlet in said base comprises an annular chamber in said base for connection with a source of compressed air and wherein a separate flexible conduit connects each of said cylindrical segments with said annular chamber.

8. An air cushion device as claimed in claim 7 wherein said diaphragm includes a concave central portion anchored at its center relative to said base and defining said plenum chamber.

9. An air cushion device as claimed in claim 8 further including openings in said central portion providing communication between said plenum chamber and inflatable chamber.

10. An air cushion device comprising: a base; means defining a plenum chamber beneath the base for confining a first cushion of air to support the device above a surface at heights within a first range when relatively low-pressure, superatmospheric air is supplied to said plenum chamber; nozzle means for providing a curtain of high-pressure air for confining a second cushion of air to support the device above a surface at heights within a second range greater than said first range when relatively high-pressure air is supplied to said nozzle means; said means defining a plenum chamber including a flexible diaphragm defining an inflatable chamber with said base; said diaphragm being extendable when said inflatable chamber is pressurized to form an outwardly extending portion defining the periphery of said plenum chamber as well as a compliant wall of a leakage slot for said plenum chamber; said nozzle means being located inwardly of the outwardly extending portion of said diaphragm; a manifold member located in said inflatable chamber for conducting flow of air to said nozzle means; said nozzle means including a plurality of openings in said diaphragm communicating with said manifold member; said manifold member comprising an endless duct located in said inflatable chamber; means defining at least one inlet in said base for compressed air; and at least one flexible conduit connecting said duct with said inlet; said diaphragm including a central portion extending inwardly from the outwardly extending portion toward the base for defining the plenum chamber; and further including a high-pressure air supply connected with said one inlet, and means for selectively conducting high-pressure air to said nozzles from said high-pressure air supply and for controlling the rate of flow to regulate the height of said curtain to provide said second cushion of air and to vary the height within said second range.

11. An air cushion device as claimed in claim 10 further including a second inlet connected with said plenum chamber, and a low-pressure, superatmospheric air supply connected with said second inlet for providing said first cushion of air.

12. An air cushion device as claimed in claim 11 further including at least one opening in the central portion of said diaphragm providing communication between said plenum chamber and said inflatable chamber.